Patented June 12, 1923.

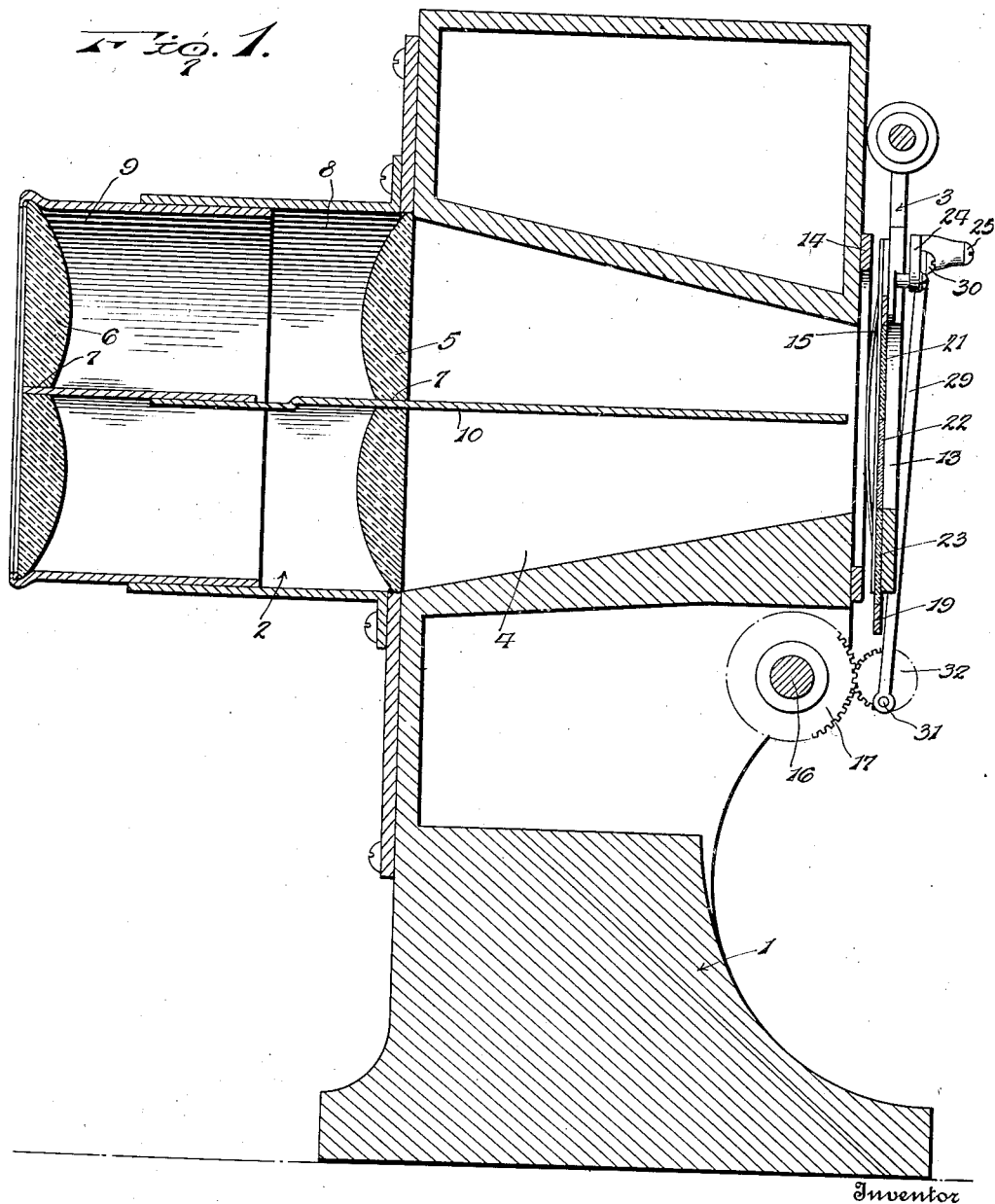

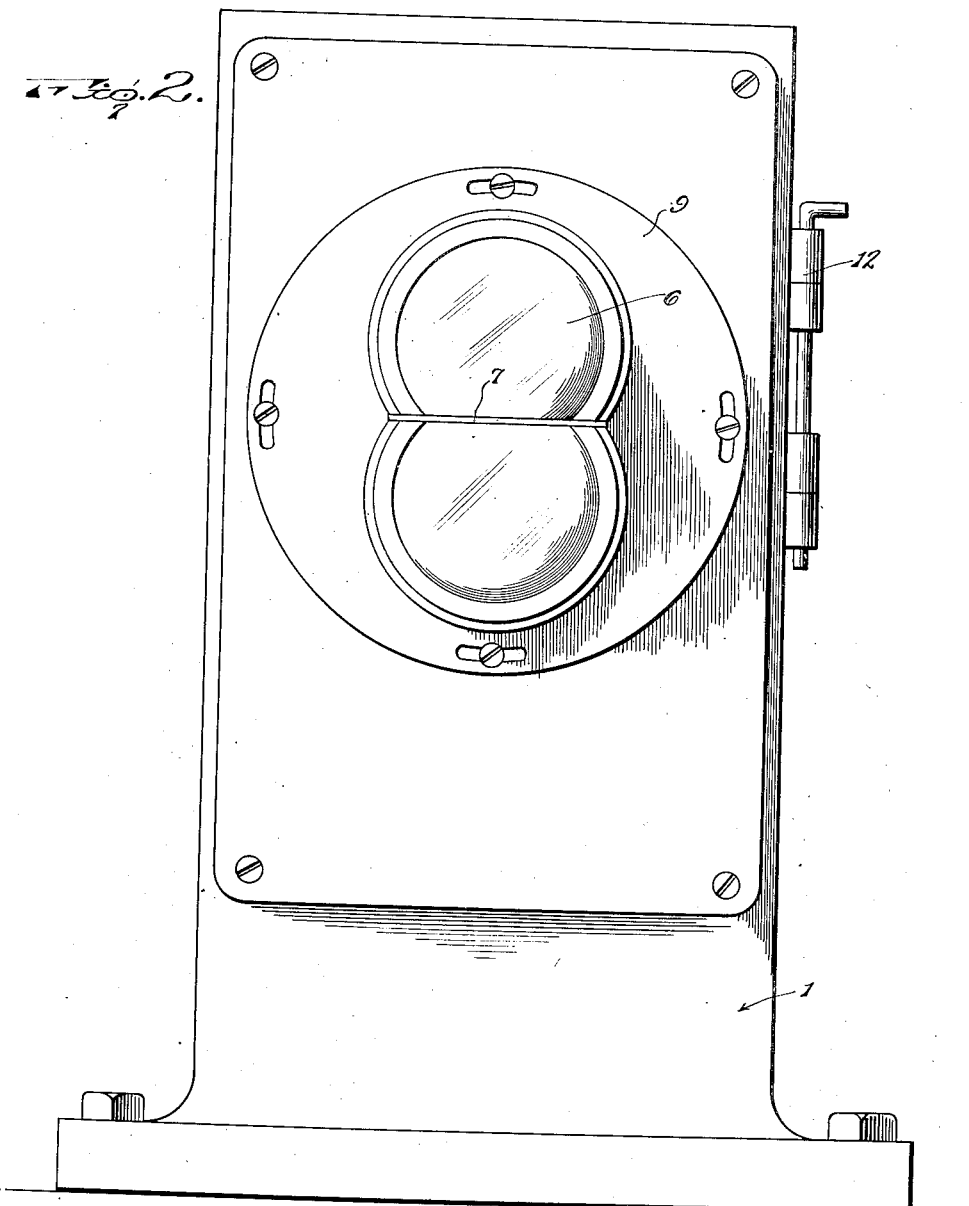

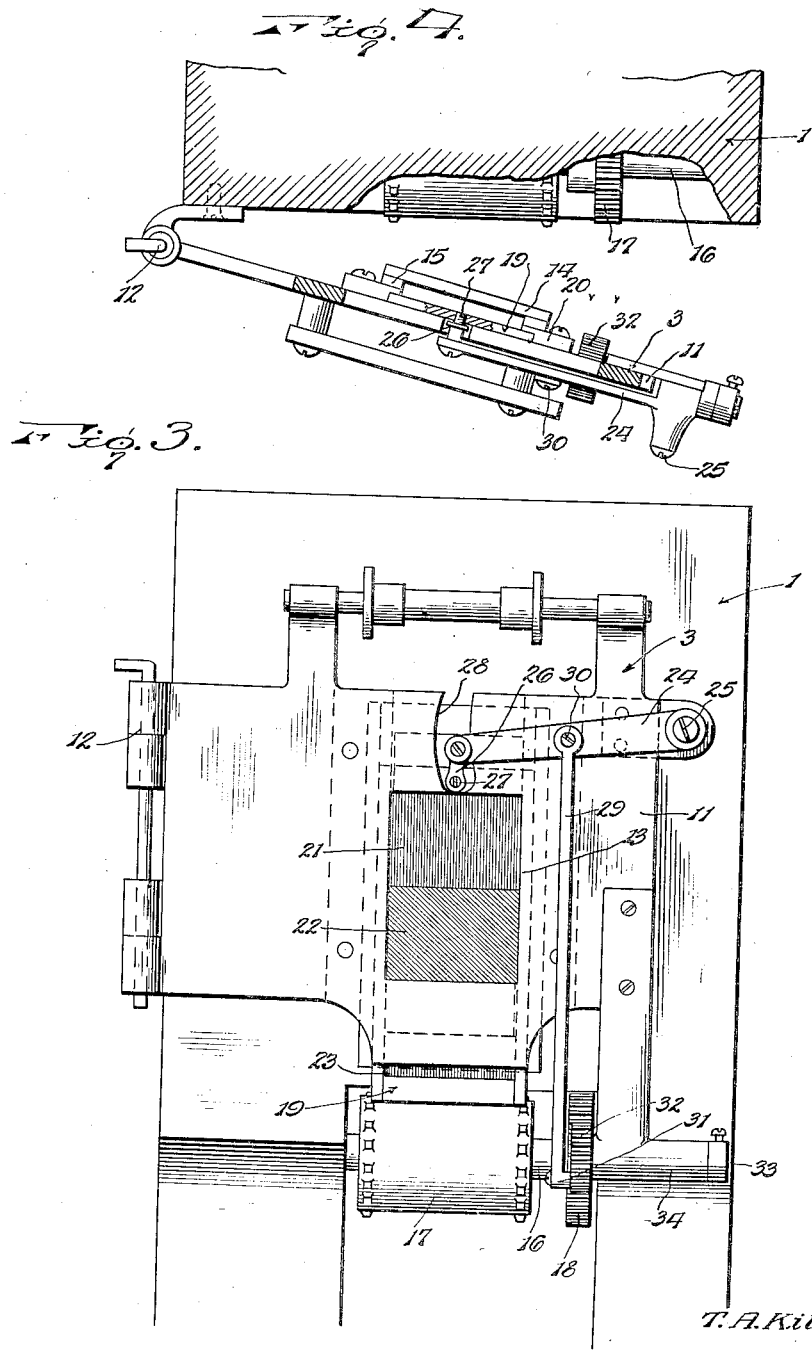

1,458,210

UNITED STATES PATENT OFFICE.

THOMAS A. KILLMAN, OF NASHVILLE, TENNESSEE.

MOTION-PICTURE-PROJECTION APPARATUS.

Application filed April 18, 1922. Serial No. 554,668.

*To all whom it may concern:*

Be it known that I, THOMAS A. KILLMAN, a citizen of the United States, residing at Nashville, in the county of Davidson and State of Tennessee, have invented certain new and useful Improvements in Motion-Picture-Projection Apparatus, of which the following is a specification.

This invention relates to improvements in apparatus for projecting motion pictures in colors and more particularly that type employing film having color value or more specifically film, alternate picture areas of which represent exposure through complementary color media. Such a film, as employed in the projection apparatus, is printed from negative film alternate picture areas of which have been exposed through filter screens of complementary colors as for example red and green, and the present invention contemplates the provision, upon the film gate of several well known types of projection apparatus, of means operated through and in consonance with the movement of the intermittent film sprocket to reciprocate a color screen in operative relation to the aperture of the film gate so as to bring portions thereof having complementary colors, into proper relation to the picture areas of the film as the film is fed by the sprocket.

One of the objects of the present invention is to provide a means which will operate positively to properly shift the color screen in consonance with the feeding of the film, the screen being shifted from one position to the other while the film is being advanced between the periods of projection and being held stationary during each period of projection and while the film itself is stationary.

Another object of the invention is to so construct the mechanism that while it is, practically in its entirety, caried by the film gate, its presence will not in any way interfere with the threading of the film or with the feeding of the film in the customary manner during the periods of occultation.

In the accompanying drawings:

Figure 1 is a vertical front to rear sectional view illustrating a projection apparatus embodying the principles of the present invention;

Figure 2 is a front elevation of the apparatus shown in Figure 1;

Figure 3 is a rear elevation of the apparatus;

Figure 4 is a plan view thereof, parts being shown in horizontal section.

In the drawings the numeral 1 indicates in general the motion head of the projecting apparatus, 2 the objective lens set, and 3 the film gate. The pedestal of the motion head 1 is provided with an opening 4 extending from front to rear therethrough for the passage of the light rays from the film to the objective lenses, and in the apparatus embodying the invention these lenses are arranged in two pairs one indicated by the numeral 5 and the other by the numeral 6. The lenses of each pair are cut on chordal lines and they are arranged with their chordal sides 7 in close proximity as best shown in Figures 1 and 2 of the drawings. The lenses 5 are located within the rear end of the fixed section of the lens case which is indicated by the numeral 8, and the lenses 6 are located in the forward end of the adjustable section 9 of the said lens case. The optical axes of the upper lenses 5 and 6 are in alignment as are also the optical axes of the corresponding lower lenses and the lenses are so adjusted that the light rays collected by the upper and lower sets will be projected onto the screen in over-lapped relation. In other words, as will presently be explained the upper lenses 5 and 6 will collect and project the light rays from one picture area of the film while the lower lenses 5 and 6 will collect and project the light rays passing through the next adjacent picture area of the film so that the two areas will be projecting in over-lapped relation on the screen and, being in complementary colors by reason of the interposition of the color screen to be presently described, will blend so as to produce a picture in which the objects will appear in their natural colors. In order that there may be no interference between the light rays projected through the two picture areas before being collected and projected by the upper and lower lens sets, a partition 10 is provided between the said upper and lower lens sets and within the opening 4 in the pedestal of the motion head, this partition extending from the front lenses 6 to a point close to the aperture of the film gate.

The film gate 3 comprises the usual plate 11 hingedly supported for swinging movement as indicated by the numeral 12 and provided with a film aperture 13 which, unlike the usual aperture in the gate, is of dimensions to simultaneously accommodate two adjacent picture areas on the film. The numeral 14 indicates the usual tension plate with its spring elements 15 which serve to tension the film as it passes through the gate, and the numeral 16 indicates the usual intermittent film sprocket shaft actuated by any of the ordinary and well known intermittent motions and carrying the usual film sprocket indicated by the numeral 17. Fixed upon the film sprocket shaft 16 is a gear 18 through the medium of which power is to be transmitted from the shaft 16 to the mechanism provided upon the film gate for shifting the color screen in front of the film aperture 13.

The color screen above referred to is indicated in general by the numeral 19 and the same comprises an oblong rectangular frame vertically disposed and received slidably at its lateral edges in guide flanges 20 upon the forward side of the plate 11 of the film gate 3. Within the frame 19 of the color screen are arranged three transparent colored panes indicated one by the numeral 21 another by the numeral 22 and the third by the numeral 23, the pane 21 being the uppermost pane and the pane 23 the lowermost pane and both being colored red, the intermediate pane 22 being colored green. The guides 20 are located at opposite sides of the film aperture 13 in the plate 11 of the film gate so that the screen 19 is supported for vertical shifting motion across this aperture. Each of the panes of the color screen is of dimensions corresponding substantially to the dimensions of the picture areas of the film and consequently when the screen is in the lowered position shown in Figure 3, the panes 21 and 22 will occupy the aperture 13, the red pane 21 being located within the upper half of the aperture and the green pane 22 in the lower half thereof. When the color screen is shifted to its elevated position however the pane 22 will occupy the upper half of the aperture 13 and the pane 23 will occupy the lower half of said aperture. The screen 19 is shifted, by means to be presently described, in consonance with the intermittent feeding of the film past the aperture 13. The film is fed the distance of one picture area in each cycle of movement of the film sprocket 17 and is initially threaded through the film gate in such manner that one of its picture areas which has a red color value will be in registration with the pane 21 and the next adjacent picture area which will have a green color value will be in registration with the pane 22, assuming the color screen 19 to be in the lowered position shown in Figure 3. When the film has been thus threaded into the machine and the color screen is in the position stated during a period projection the two picture areas will be projected in their respective colors in over-lapped relation upon the screen and will blend so as to produce a composite picture in which the objects will appear in their natural colors. During the succeeding period of occultation, the film will be fed downwardly by the film sprocket 17 a distance of one picture area thus bringing the area having red color value and which was previously in position opposite the pane 21, to position within the lower half of the aperture 13 and being replaced by a picture area having green color value. Simultaneously the color screen 19 will be shifted upwardly so as to bring the red pane 23 into registration with the picture area previously in registration with the red pane 21, and bringing the green pane 22 into registration with the picture area having green color value and which has assumed the position formerly occupied by the first mentioned picture area in the upper half of the aperture 13.

The means provided for shifting the color screen 19 comprises a rock arm 24 pivotally supported at its outer end upon a pivot stud 25 at the upper outer corner of the plate 11 of the film gate, this arm extending across the rear side of the said plate and having pivotally suspended from its inner end a link 26 which is connected as at 27 with the upper end of the frame of the color screen, this link and its connection with the arm 24 working in an arcuate slot 28 formed in the upper portion of the plate 11 above the aperture 13 as clearly shown in Figures 3 and 4 of the drawings. A pitman 29 is connected at its upper end as at 30 to the arm 24 midway between the points of pivotal mounting of the arm and its connection with the link 26, and this pitman at its lower end is connected to crank pin 31 upon a pinion 32 mounted upon a shaft 33 rotatably supported in a suitable bearing bracket 34 at the lower outer corner of the plate 11. When the film gate is closed the pinion 32 will be brought into mesh with the gear 18 and when the apparatus is in operation, will be rotated through rotation of the said gear. Rotation of the pinion 32 will result in oscillatory motion being imparted to the rock arm 24 through the pitman connection 29 and in this manner the color screen 19 will be shifted up and down in consonance with the intermittent rotation of the film sprocket 17 to feed the film. When the film gate is swung to open position as for example as shown in Figure 4 of the drawings, the pinion 32 will be moved out of mesh with the gear 18, and the film may therefore be threaded through the film gate in the usual manner and without interference on the part of the mechanism provided for shifting the color screen 19. While care must be exercised by the operator to properly initially position picture areas having red and green color value in registration respectively with the panes 21 and 22 of the color screen, this will not be difficult of accomplishment in view of the fact that the screen will tend to assume by gravity the lowered position shown in Figure 3 and as the pinion 32 is out of mesh with the gear 18 when the film gate is swung to open position, the said screen and the arm 24 will assume the lowered position.

Having thus described the invention what is claimed as new is:

1. In apparatus for projecting motion pictures in color from film having alternate picture areas possessing complementary color value, a film gate having an aperture to accommodate two picture areas of the film, means for shifting the film intermittently the distance of one picture area, a color screen supported in operative relation to said aperture and having spaced light ray transmitting areas of the same primary color and an intermittent light ray transmitting area of a complementary primary color, and means operable to shift the screens to successively bring the intermediate area and alternate ones of the first mentioned areas thereof simultaneously into operative relation to the aperture of the film gate.

2. In apparatus for projecting motion pictures in color from film having alternate picture areas possessing complementary color value, in combination, a film gate having an aperture to accommodate two picture areas of the film, mechanism operable to feed the film past the film gate intermittently the distance of one picture area to present each successive picture area thereof first at one end and then at the other end of said aperture, a color screen supported in operative relation to said aperture and having spaced light ray transmitting areas of the same primary color and an intermittent area of a complementary primary color, and means operable through and in consonance with the operation of the film advancing means for shifting the screen to successively bring the intermediate area and alternate ones of the first mentioned areas thereof simultaneously into operative relation to the aperture of the film gate.

3. In apparatus for projecting motion pictures in color from film having alternate picture areas possessing complementary color value, in combination, a film gate having an aperture to accommodate two picture areas of the film, an intermittent film sprocket shaft carrying a film sprocket for advancing the film past the aperture of the gate intermittently the distance of one picture area, a color screen supported in operative relation to said aperture and having spaced light ray transmitting areas of the same primary color and an intermediate area of a complementary primary color, and operative connection between the said screen and the said intermittent film sprocket shaft for shifting the screen to successively bring the intermediate area and alternate ones of the first mentioned areas thereof simultaneously into operative relation to the aperture of the film gate.

4. In apparatus for projecting motion pictures in color from film having alternate picture areas possessing complementary color value, in combination, a film gate having an aperture to accommodate two picture areas of the film, an intermittent film sprocket shaft carrying a film sprocket for advancing the film past the aperture of the gate, a color screen supported in operative relation to said aperture and having spaced light ray transmitting areas of the same primary color and an intermediate area of a complementary primary color, and operative connection between the said screen and the said intermittent film sprocket shaft for shifting the screen to successively bring the intermediate area and alternate ones of the first mentioned areas thereof into operative relation to the aperture of the film gate, said means comprising a shaft counter to the intermittent film sprocket shaft and driven therefrom, a crank element operated through rotation of the said counter shaft, a rock arm mounted upon the film gate and having operative connection with the said screen, and pitman connection between the crank element and the rock arm.

5. In apparatus for projecting motion pictures in color from film having alternate picture areas possessing complementary color value, in combination, a film gate having an aperture to accommodate two picture areas of the film, an intermittent film sprocket shaft carrying a film sprocket for advancing the film past the aperture of the gate, a color screen supported in operative relation to said aperture and having spaced light ray transmitting areas of the same primary color and an intermediate area of a complementary primary color, and operative connection between the said screen and the said intermittent film sprocket shaft for shifting the screen to successively bring the intermediate area and alternate one of the first mentioned areas thereof into operative relation to the aperture of the film gate, said means comprising a gear upon the intermittent film sprocket shaft, a shaft upon the film gate supported for bodily movement therewith, a pinion upon the last mentioned shaft meshing with the said gear when the film gate is closed and out of mesh therewith when the gate is opened, a crank pin upon the pinion, a rock arm mounted for oscillation upon the film gate and having operative connection with the screen, and a pitman connection between the rock arm and the crank pin.

6. In apparatus for the projection of motion pictures in colors from film having alternate picture areas possessing complementary color value, in combination, a film gate having an aperture to accommodate two picture areas of the film, a color screen arranged in operative relation to the aperture of the film gate, means for shifting the color screen in consonance with the movement of the film past the gate, a lens case arranged in operative relation to the film gate, a partition dividing the said case whereby to prevent interference of light rays passing from the individual picture areas before the film gate aperture, and a projecting lens set within the lens case comprising front and rear pairs of lenses, the lenses of each pair being arranged at opposite sides of the partition and having their adjacent sides chordal to their peripheries to bring their optical axes into juxtaposition with each other and substantially opposite the centers of the respective picture areas within the film gate aperture.

In testimony whereof I affix my signature.

THOMAS A. KILLMAN. [L. S.]